US008098559B2

(12) United States Patent
Tanaka (10) Patent No.: US 8,098,559 B2
(45) Date of Patent: Jan. 17, 2012

(54) INFORMATION RECORDING/REPRODUCING APPARATUS, APPARATUS FOR MANUFACTURING OPTICAL INFORMATION RECORDING MEDIUM, AND OPTICAL INFORMATION RECORDING MEDIUM

(75) Inventor: Yukinobu Tanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 118 days.

(21) Appl. No.: 12/457,181

(22) Filed: Jun. 3, 2009

(65) Prior Publication Data

US 2010/0080104 A1    Apr. 1, 2010

(30) Foreign Application Priority Data

Sep. 30, 2008   (JP) ................. 2008-252094

(51) Int. Cl.
    *G11B 7/00* (2006.01)
(52) U.S. Cl. ...................................... 369/103
(58) Field of Classification Search .......... 369/103
    See application file for complete search history.

(56) References Cited

U.S. PATENT DOCUMENTS

| 5,566,387 A * | 10/1996 | Dewald ............... 369/103 |
| 7,339,710 B2 * | 3/2008 | Chuang ............... 359/3 |
| 2004/0179251 A1 | 9/2004 | Anderson et al. |
| 2008/0192311 A1 | 8/2008 | Horimai |
| 2010/0080103 A1 * | 4/2010 | Matsuda ............... 369/103 |

FOREIGN PATENT DOCUMENTS

| JP | 2004-272268 | 3/2004 |
| JP | 2005-222591 (A) | 8/2005 |
| WO | WO 2004-102542 | 5/2004 |

OTHER PUBLICATIONS

Office Action issued by the Japanese Patent Office on Nov. 8, 2011, in the corresponding Japanese Patent Application No. 2008-252094 (2 pages).

* cited by examiner

*Primary Examiner* — Wayne Young
*Assistant Examiner* — Brenda Bernardi
(74) *Attorney, Agent, or Firm* — Stites & Harbison PLLC; Juan Carlos A. Marquez, Esq.

(57) ABSTRACT

An optical information recording/reproducing apparatus equipped with a mechanism for moving an optical pickup to an arbitrary radial position of an optical information recording medium using holography. A total sum signal of signals is generated at the photodetector for receiving signals reproduced from the optical information recording medium, and a radial position of the pickup is obtained from the number of pulses in the total sum signal to thereby allow the pickup to move to an arbitrary radial position.

9 Claims, 14 Drawing Sheets

CALCULATION EXAMPLE OF RADIAL POSITION

RADIAL POSITION DISPLACEMENT CALCULATION EXAMPLE

INFORMATION RECORDING/REPRODUCING APPARATUS, APPARATUS FOR MANUFACTURING OPTICAL INFORMATION RECORDING MEDIUM, AND OPTICAL INFORMATION RECORDING MEDIUM

INCORPORATION BY REFERENCE

The present application claims priority from Japanese application JP2008-252094 filed on Sep. 30, 2008, the content of which is hereby incorporated by reference into this application.

BACKGROUND OF THE INVENTION

The present invention relates to an apparatus for recording information in an optical information recording medium and/or reproducing information from an optical information recording medium, by using holography, an apparatus for manufacturing an optical information recording medium, and an optical information recording medium.

In the studies of next generation storage technologies, attention has been paid to hologram recording technologies for recording digital information by utilizing holography.

As documents regarding hologram recording, there is JP-A-2004-272268 (corresponding to US2004/0179251). This Publication describes a so-called angle multiplex recording method by which at the same time when a signal light flux is converged upon an optical information recording medium with a lens, reference light as a parallel light flux is applied to generate interference and record a hologram, and multiple recording is performed by displaying different page data on a spatial optical modulator while an incidence angle of the reference angle upon the optical information recording medium is changed. This Publication describes further the techniques of increasing a record density/capacity more than a conventional angle multiplex recording method by converging a signal light with a lens and disposing a numerical aperture (spatial filter) on a beam waist to thereby shorten pitches between adjacent holograms.

Another document is WO2004-102542 (corresponding to US2008/0192311). This Publication describes an example utilizing a shift multiplex method by which light from inner pixels is used as signal light, light from outer pixels in a ring shape is used as reference light, and both the light fluxes are converged upon an optical recording medium with a single lens to record holograms through interference between signal light and reference light near at the focal plane of the lens.

SUMMARY OF THE INVENTION

For an apparatus for recording information in an optical information recording medium and/or reproducing information from an optical information recording medium, address technologies serving as a wobble of a conventional record type optical disc have not been established as yet.

As different from conventional technologies of DVD, BD and the like, recording is performed in the plane unit, according to the recording technologies utilizing holography. In recording information in the plane unit, 1'a and 0's are dispersed generally uniformly in each plane because of various coding rules. Therefore, a total amount of reflection light from a plane area constituting a recording unit has a small variation irrespective of the position on the medium or the contents of information to be recorded. The present inventor has paid attention to this peculiar performance of a recording medium utilizing holography, and has developed the technologies of using a signal obtained from a unit area itself where information is recorded, to detect a position of a pickup and the like.

The present invention aims at providing an optical information recording/reproducing apparatus capable of detecting a position of a pickup relative to an optical information recording medium utilizing holography, an optical information recording medium, and an apparatus for manufacturing an optical information recording medium.

The above-described issue can be settled by the inventions described, for example, in the appended claims.

According to the present invention, it is possible to provide an optical information recording/reproducing apparatus capable of detecting a position of a pickup relative to an optical information recording medium utilizing holography, an optical information recording medium, and an apparatus for manufacturing an optical information recording medium.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention will now be described.

Figure 1:
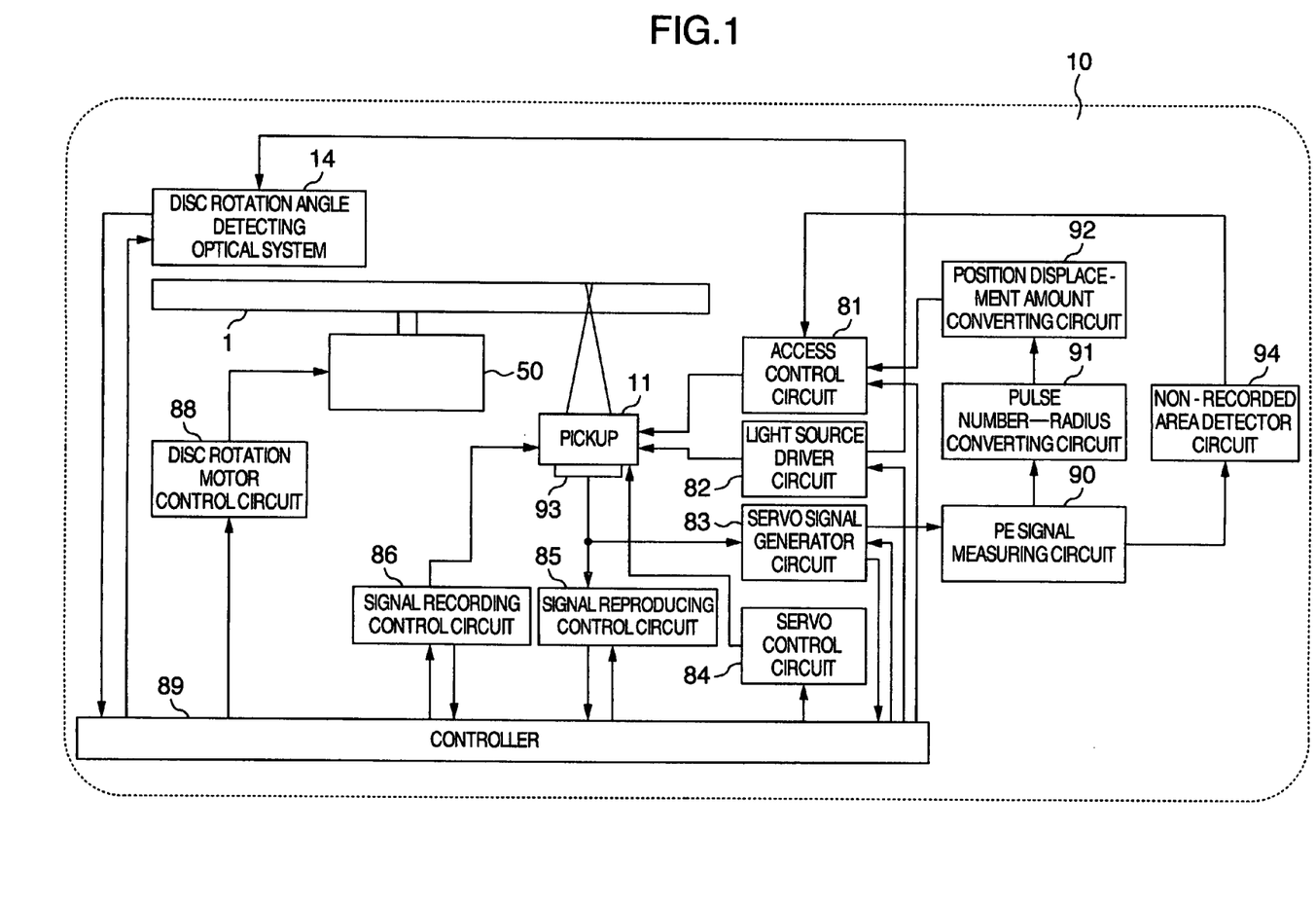
FIG. 1 is a schematic diagram illustrating an embodiment of an optical information recording/reproducing apparatus.

FIG. 1 illustrates the whole structure of an optical information recording/reproducing apparatus 10 for recording digital information and/or reproducing digital information, by utilizing holography. In order to record and/or reproduce desired data in and/or from an optical information recording medium 1 loaded on the optical information recording/reproducing apparatus 10, it is required to position a pickup 11 at a desired position. For this positioning method, the number of pulses obtained from a pull-in error (PE) signal is utilized. The details thereof will be described later.

The optical information recording/reproducing apparatus 10 is equipped with the pickup 11, a disc rotation angle detecting optical system 14 and a motor 50. The optical information recording medium 1 can be rotated with the motor 50.

The pickup 11 fulfils a role of recording and/or reproducing digital information by radiating light to the optical information recording medium 1 and utilizing holography.

Information recorded in the optical information recording medium 1 is detected with a photodetector 93 as reproduced light obtained by radiating light from the pickup 11, and a signal is reproduced from the reproduced light at a signal reproducing control circuit 85. The disc rotation angle detecting optical system 14 is used for detecting a rotation angle of the optical information recording medium 1. In adjusting the optical information recording medium to a predetermined rotation angle, the disc rotation angle detecting optical system 14 detects a signal corresponding to the rotation angle, and in accordance with the detected signal, a controller 89 controls the rotation angle of the optical information recording medium 1 via a disc rotation motor control circuit 88.

A light source driver circuit 82 is used for emitting a light beam at a predetermined light amount. The pickup 11 is provided with a mechanism for sliding the position thereof along a radial direction of the optical information recording medium 1, this position control being executed via an access control circuit 81.

Recording technologies utilizing holography are technologies allowing information recording at an ultra high density. Therefore, as described in a non-patent document "Tolerances of a Page-Based Holographic Data Storage System" Alan Hoskins, et al., Optical Data Storage Topical Meeting, 2007, there is a tendency that an error margin of displacement of, e.g., an inclination and a position of the optical information recording medium 1 becomes very small. The pickup 11 may therefore be provided with a mechanism for detecting a displacement amount of a displacement factor having a small error margin of displacement of, e.g., an inclination and a position displacement of the optical information recording/reproducing apparatus, and the optical information recording/reproducing apparatus 10 may be provided with a servo mechanism for correcting the displacement amount via the serve control circuit 84 in accordance with a servo control signal generated by a servo signal generator circuit 83.

A PE signal measuring circuit 90 is a circuit for measuring the number of pulses and a period of a PE signal obtained from the servo signal generator circuit 83. The PE signal measuring circuit 90 is constituted of, e.g., a DSP such as an ASIC.

A pulse number-radius converting circuit 91 is a circuit for converting a PE signal measured with the PE signal measuring circuit 90 into a radial position. The pulse number-radius converting circuit 91 is constituted of, e.g., a DSP such as an ASIC.

A position displacement amount converting circuit 92 is a circuit for calculating a difference between a target radial position and the converted radial position, if the conversion result by the pulse number-radius converting circuit 91 is different from the target radial position of the pickup 11. In accordance with this difference, the access control circuit 81 controls the position of the pickup 11.

The pickup 11 and disc rotation angle detecting optical system 14 may be constituted of several optical systems or a simplified structure integrating all optical systems.

A photodetector 93 photoelectrically converts reproduced light supplied from the optical information recording medium 1 into an electric signal. The servo signal generator circuit 83 generates a PE signal as a total sum of detected signals, in accordance with the converted electric signals.

A non-recorded area detector circuit 94 detects a presence/absence and position of a non-recorded area on the optical recording medium 1, in accordance with an output from the PE signal measuring circuit 90. The non-recorded area detector circuit 94 is constituted of, e.g., a DSP such as an ASIC.

Figure 2:
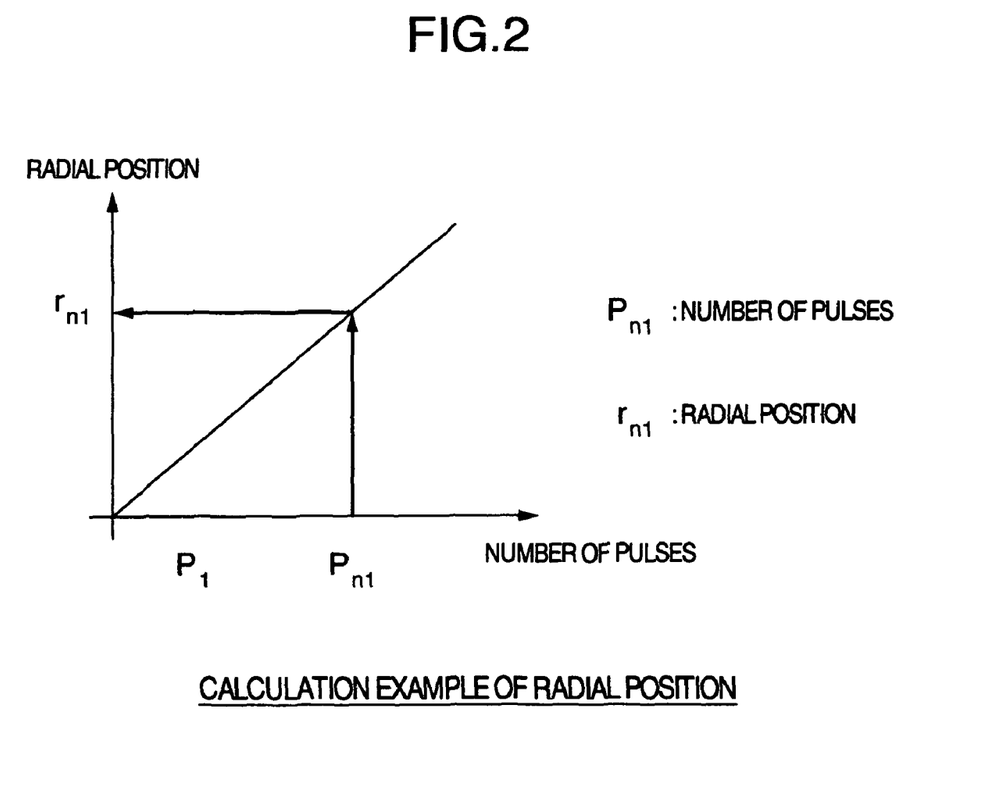
FIG. 2 is a diagram illustrating the relation between the number of PE pulses and a radial position.

FIG. 2 is a conceptual diagram illustrating the relation between the number of PE pulses and a radial position. If there is a correlation such as illustrated in FIG. 2 between the number of pulses detected with the pickup 11 and a radial position on the optical information recording medium, the number of pulses can be converted into a radial position. A PE signal is one of servo control signals, and a total sum signal of reproduced light.

Figure 3:
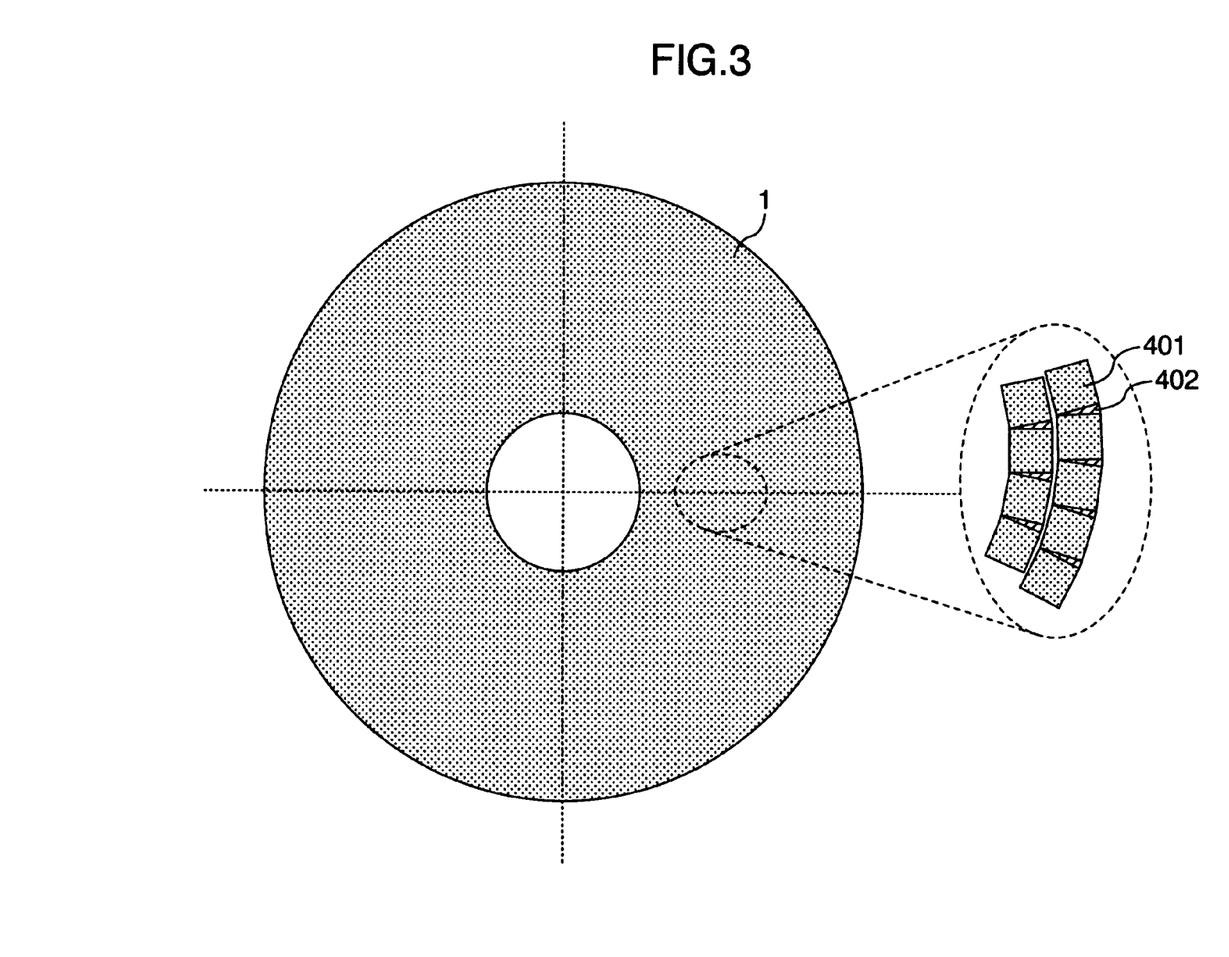
FIG. 3 is a diagram illustrating data recorded regions and data non-recorded regions formed when data is recorded in a rectangular shape on an optical information recording medium.

FIG. 3 is a diagram illustrating data recorded regions and data non-recorded regions when data is recorded in a rectangular shape on an optical information recording medium 1. If data is recorded in a rectangular shape as illustrated in FIG. 3 even over the whole area of the optical information recording medium of, e.g., a circular shape, non-recorded regions 402 are formed inevitably. These non-recorded regions 402 are formed as gaps between a plurality of recorded portions 401 juxtaposed along a circumferential direction. A waveform of a PE signal reproduced from the non-recorded regions 402 and recorded regions 401 of the optical information recording medium 1 is a pulse waveform such as illustrated in FIG. 4.

Figure 4:
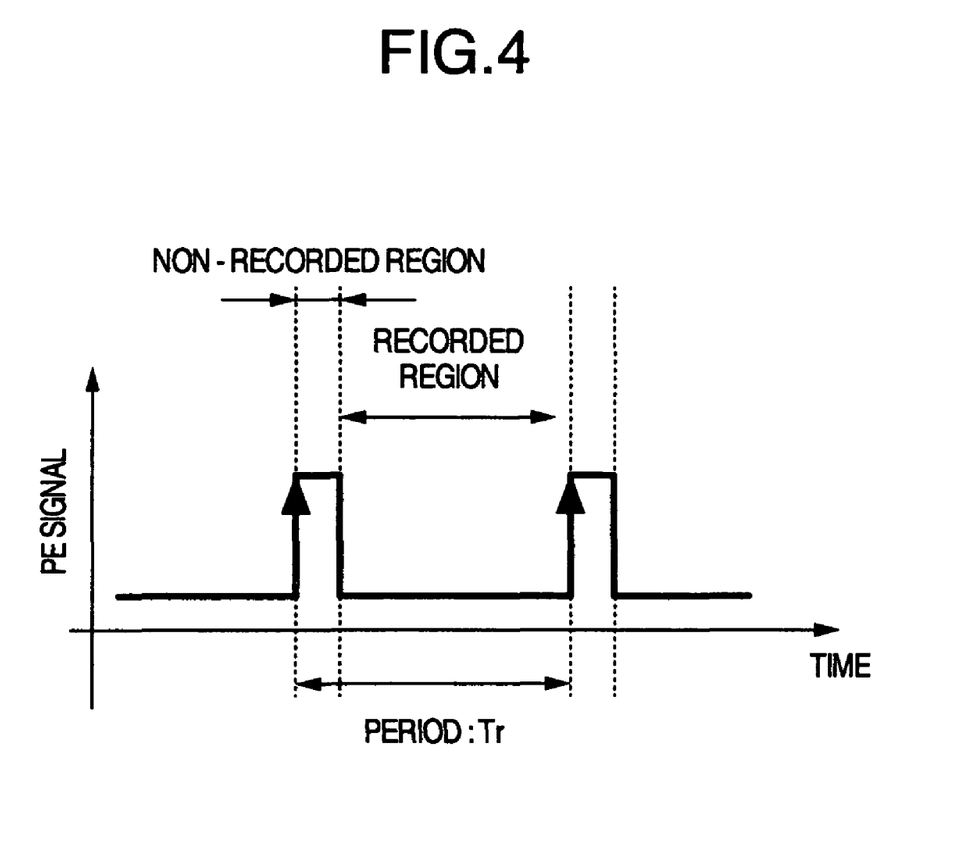
FIG. 4 is a schematic diagram illustrating a PE signal waveform obtained from an optical information recording medium with data recorded over the whole surface.

In the example illustrated in FIG. 4, it is assumed that a light amount reflected from the non-recorded region 402 is larger than that reflected from the recorded region 401. As the optical information recording medium 1 is rotated, a periodical and pulsated waveform is obtained having a period of Tr. Tr corresponds to a period of a PE signal obtained from one recorded region 401 and one non-recorded region 402 in contact with the recorded region 401 along the circumferential direction. If data is recorded, for example, in a concentric manner, the number of recordable data pieces increases as the radial position becomes far from the disc center. A method of positioning the pickup 11 at a desired radial position may be considered, which converts the number of pulses into a radial position in accordance with a correlation between the number of pulses and the radial position.

In the above-described example, each recorded region 401 is rectangular. The shape of the recorded region 401 is not limited to a rectangle, but any shape may be adopted so long as non-recorded regions are formed as a plurality of recorded regions are disposed on an optical information recording medium. For example, the shape of the recorded region 401 may be circular, ellipsoidal, polygonal such as triangular or the like, in addition to the rectangular shape.

Figure 5:
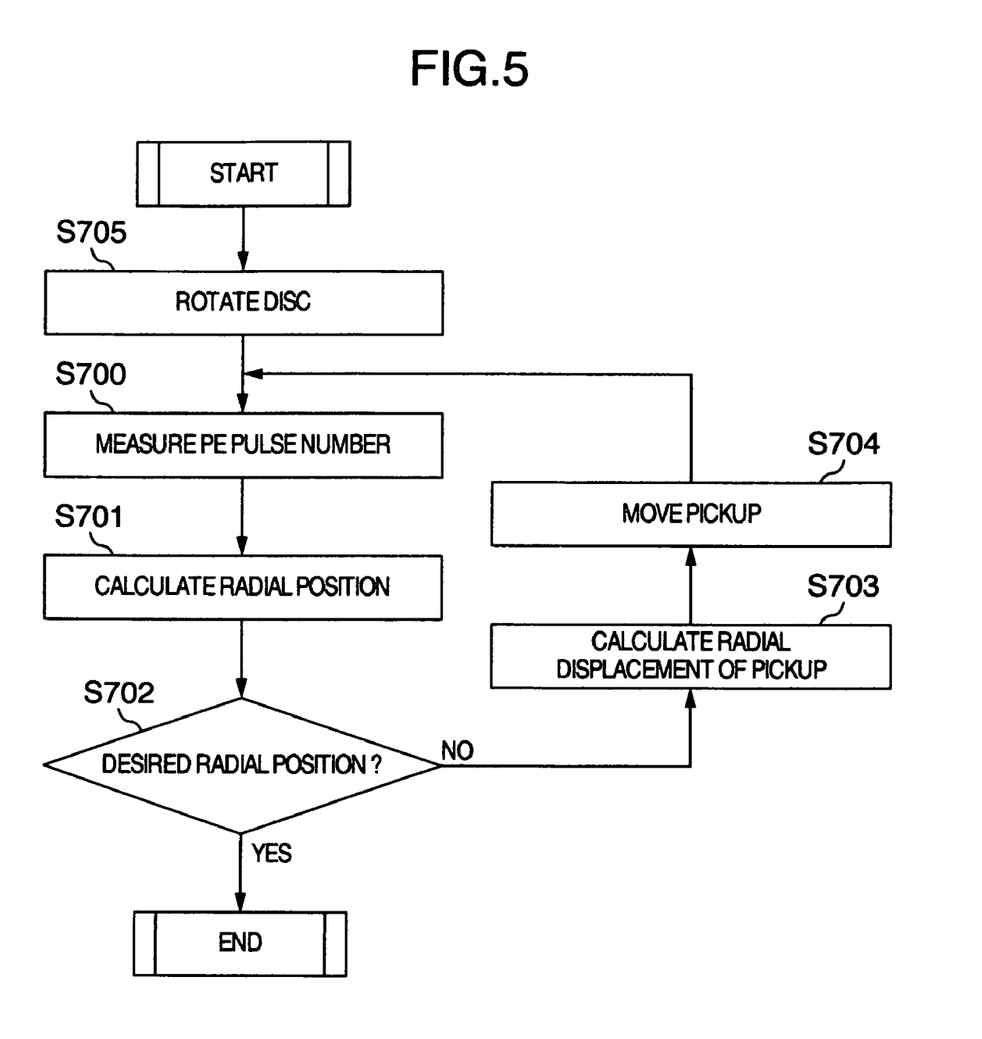
FIG. 5 is a flow chart illustrating a positioning process.

Next, description will be made on an example of a process of positioning the pickup 11 to a desired position, by using the flow chart illustrated in FIG. 5. First, at S705 the optical information recording medium 1 is rotated by one turn or by a desired angle, and at S700 the PE signal measuring circuit 90 measures the number of pulses obtained during this rotation. Next, in accordance with the relation illustrated in FIG. 2, at S701 the pulse number-radius converting circuit 91 converts the number of pulses into a radial position. At S702 it is judged whether this radial position is a desired position, whereas if not, at S703 the position displacement amount converting circuit 92 calculates a position displacement amount between the converted radial position and the desired radial position of the pickup 11, and positioning the pickup 11 is executed again at S704 through position control of the pickup 11 by the access control circuit 81. Thereafter, the steps at S700 and following steps are repeated to position the pickup 11 at a desired position. If a desired radial position is obtained, positioning the pickup 11 is executed at a rise edge of a PE signal.

Figure 6:
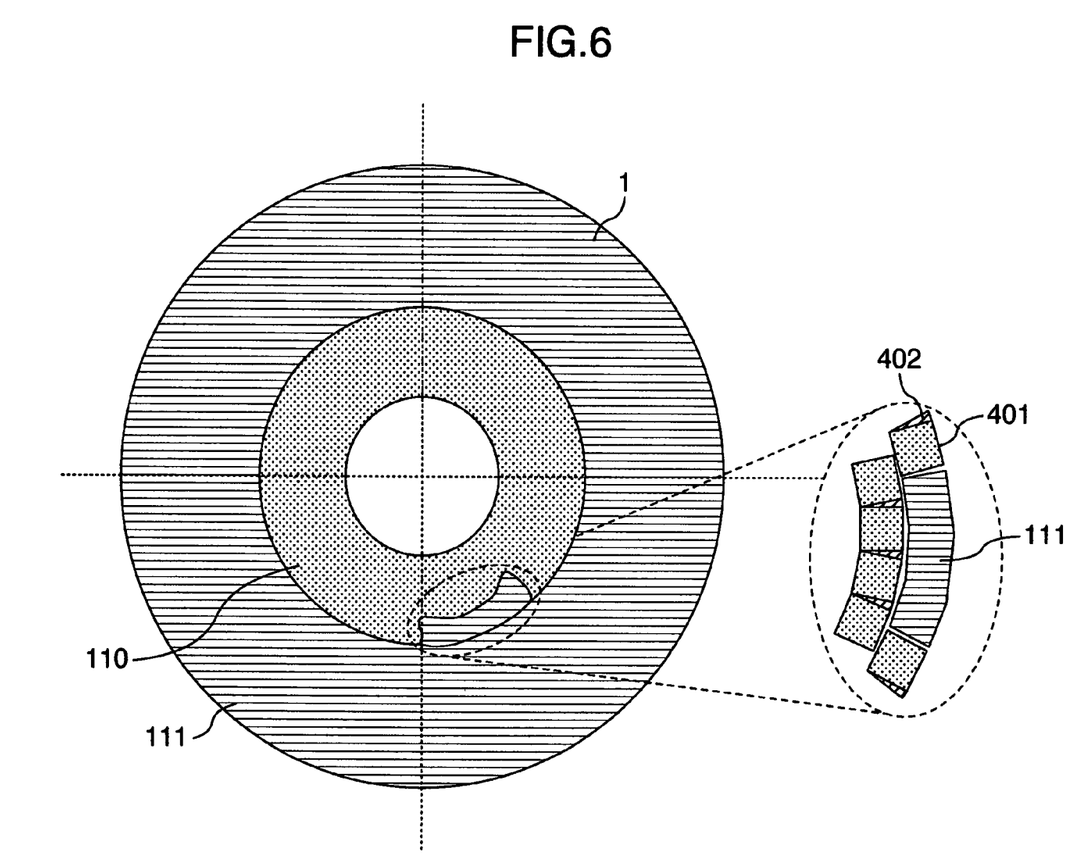
FIG. 6 is a schematic diagram of an optical information recording medium with mixed recorded regions and non-recorded regions.
Figure 7:
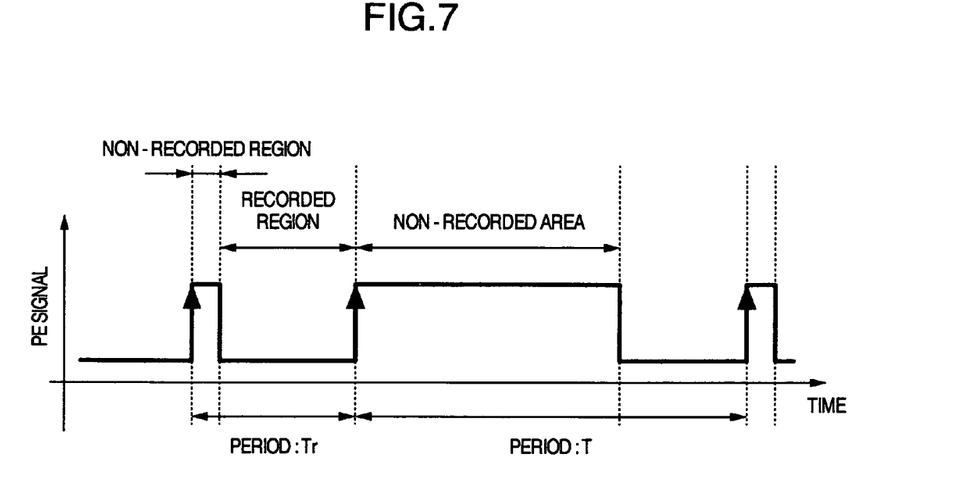
FIG. 7 is a schematic diagram illustrating a PE signal waveform obtained from an optical information recording medium with mixed recorded regions and non-recorded regions.

Next, description will be made on a method of judging record/non-record of the optical information recording medium 1 by utilizing a PE signal having a pulse waveform period of Tr. The pulse waveform is obtained only after data is recorded on the optical information recording medium 1. If data is recorded in a partial area of the optical information recording medium 1, the optical information recording medium 1 has a recorded area 110 and a non-recorded area 111 mixedly, as illustrates in FIG. 6. As the optical information recording medium 1 illustrated in FIG. 6 is rotated by one turn, a PE signal of a pulse waveform illustrated in FIG. 7 is obtained. As illustrated in FIG. 7, while the pickup 11 covers the non-recorded area 111, a PE signal value is maintained high, and this period is prolonged. The recorded area 110 is an area or region of the optical information recording medium 1, and includes recorded regions 401 and non-recorded regions 402. The non-recorded area 111 is an area or region of the optical information recording medium 1 where data is not recorded, and does not include the recorded region 401. The non-recorded area 111 is an area or region where information on user data or the like is not recorded, and has an area larger than at least the area of one non-recorded region 402. The optical information recording/reproducing apparatus 10 of this embodiment judges the non-recorded area in accordance with the period of a PE signal. A specific example of the judging method will be described below.

For example, if a measurement result of a pulse waveform indicates a period longer than Tr, the optical information recording/reproducing apparatus 10 positions the pickup 11 at the timing of a rise edge of the PE signal from which the period longer than Tr starts, and thereafter data recording starts. This is because the rise edge of the PE signal is a border between the recorded area 110 and non-recorded area 111.

Figure 8:
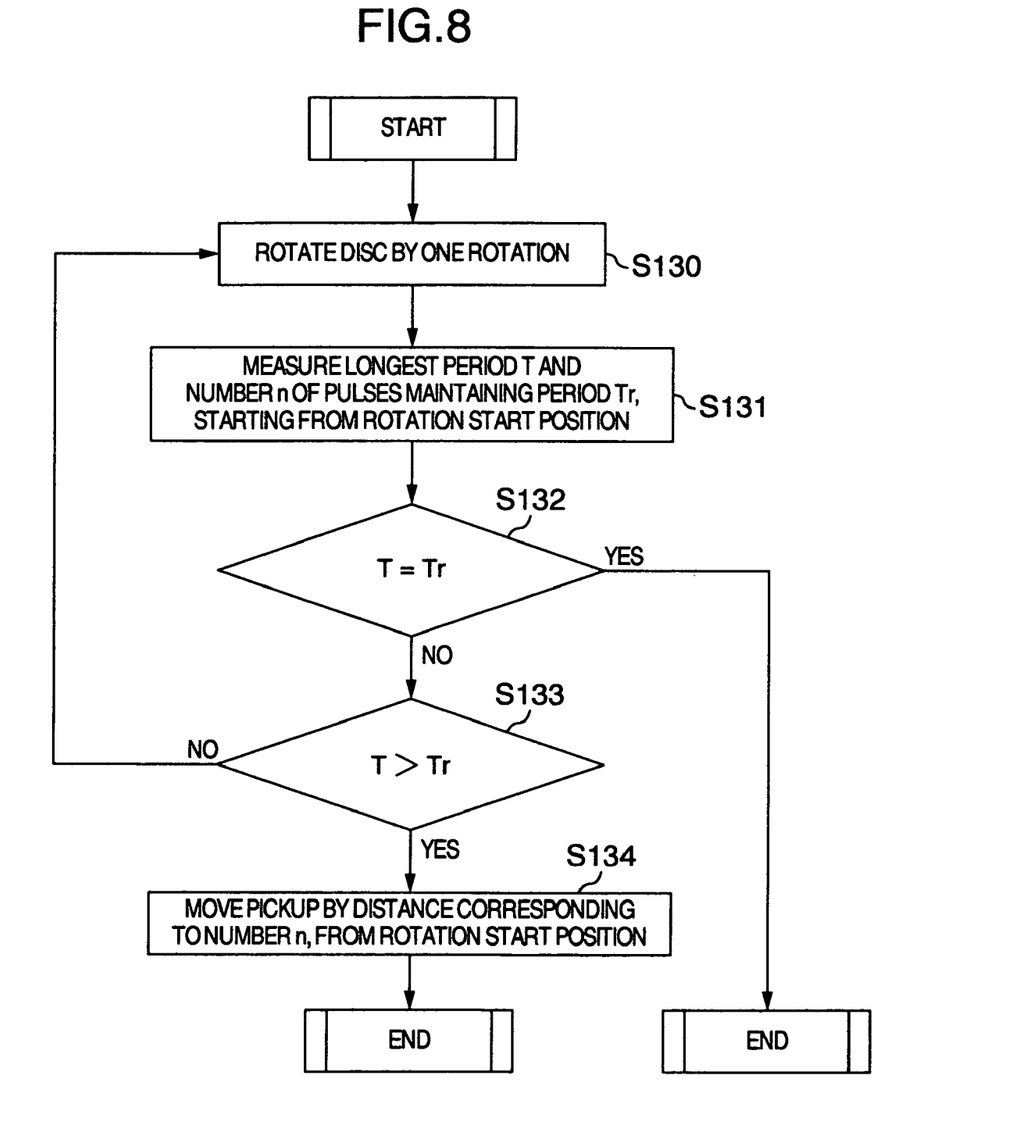
FIG. 8 is a flow chart illustrating a positioning process.

FIG. 8 is an example of a flow chart illustrating a record/non-record judging method. First, at S130 the optical information recording medium 1 is rotated by one turn. During this rotation, at S131 the PE signal measuring circuit 90 measures the number of pulses having a pulse waveform period of Tr and the longest period T, starting from the rotation start position relative to the pickup 11. Next, at S132 the non-recorded area detecting circuit 94 judges whether the longest period T measured at S131 is equal to Tr. If T is substantially equal to Tr, the non-recorded area 111 does not exist at the radial position corresponding to the rotation start position relative to the pickup 11.

If it is judged at S132 that the longest period T is not equal to the period Tr, the non-recorded area detecting circuit 94 judges at S133 whether T is longer than Tr. If the PE signal measuring circuit 90 measures the period T longer than Tr, the non-recorded area 111 exists. Since the PE signal measuring circuit 90 obtains at S131 the number n of pulses having the period Tr as counted from the rotation start position relative to the pickup 11, at S134 the position of the pickup 11 is controlled via the access control circuit 81 to move the pickup 11 by a distance corresponding to the number n of pulses. In this manner, the pickup 11 can be positioned at the non-recorded area 111 and information can be recorded in the optical information recording medium 1. If T is shorter than Tr, measurement is executed again.

Although the PE signal waveform has a rise edge at the non-recorded area 111 and non-recorded region 402, it may have a fall edge. A polarity of the PE signal may be reversed.

Since there is a case in which the rotation start position is in the non-recorded area, the optical information recording medium or the motor may be rotated by more than one turn.

Second Embodiment

Figure 12:
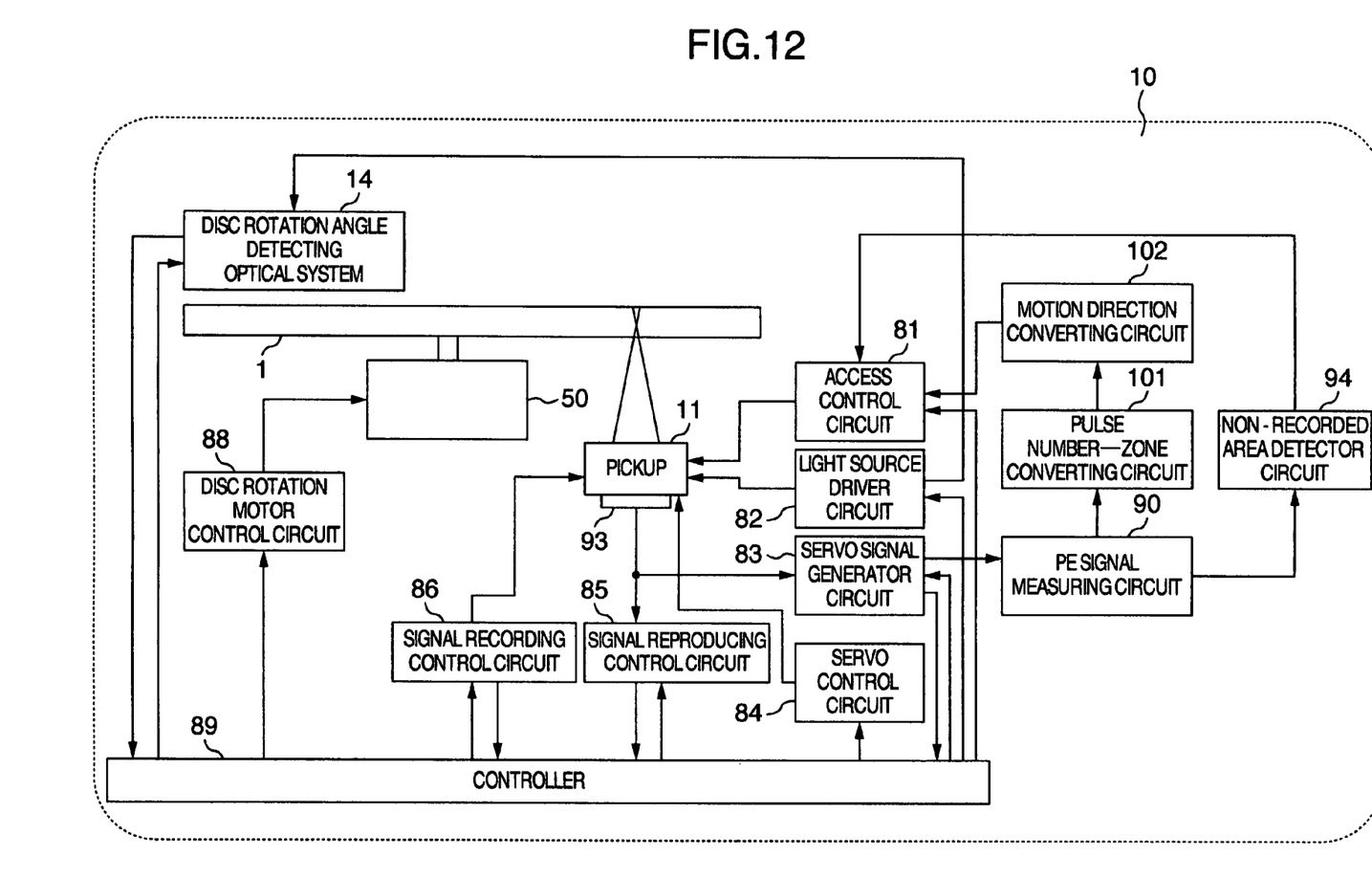
FIG. 12 is a schematic diagram illustrating an embodiment of an optical information recording/reproducing apparatus.

FIG. 12 is a schematic diagram illustrating the structure of an optical information recording/reproducing apparatus 10 of the second embodiment. The structure illustrated in FIG. 12 is the same as illustrated in FIG. 1, excepting that the position displacement amount converting circuit is replaced with a motion direction converting circuit 102, and that the pulse number-radius converting circuit is replaced with a pulse number-zone converting circuit 101.

Figure 11:
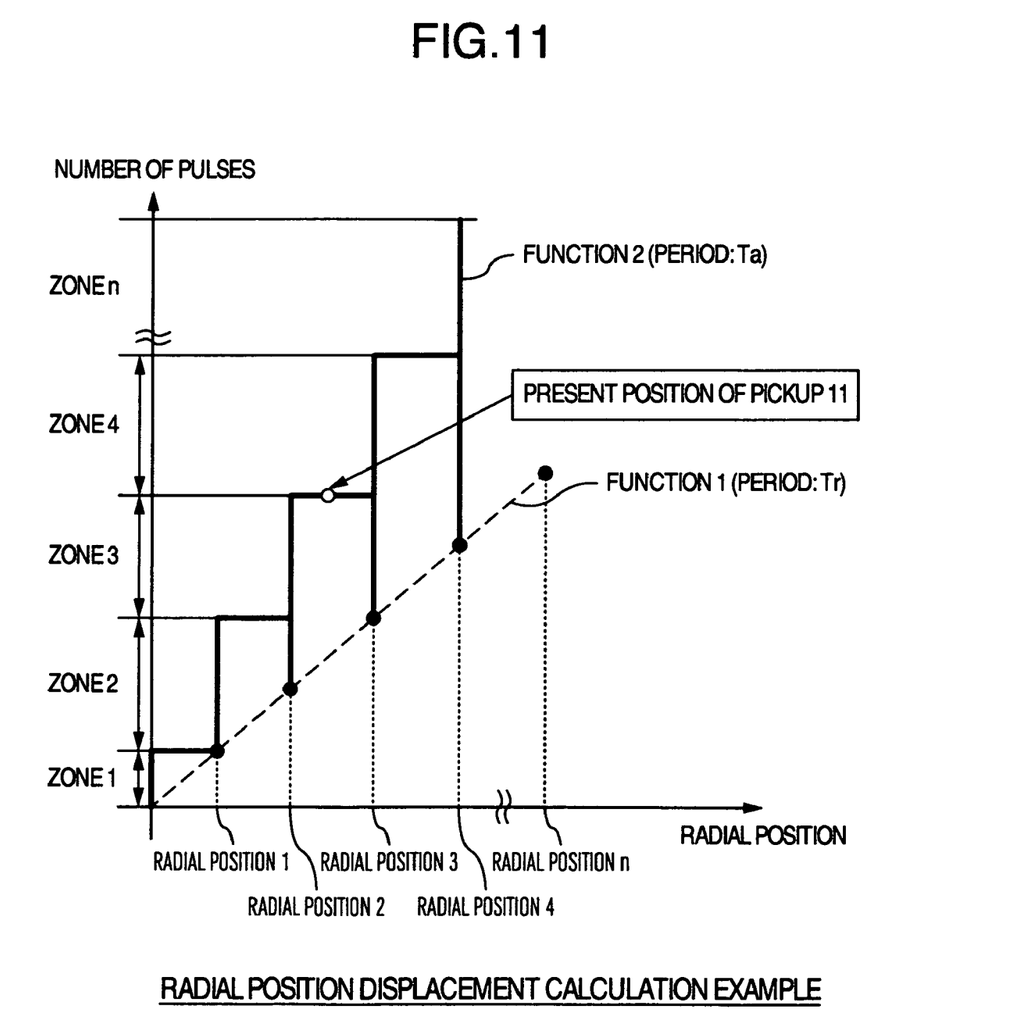
FIG. 11 is a diagram illustrating the relation between the number of pulses and a radial position when there is a radial position displacement of a pickup.

The optical information recording/reproducing apparatus 10 of the embodiment confirms whether positioning of the pickup 11 along the radial direction is correct. This radial position confirmation is performed in accordance with the relation between the number of pulses and a radial position in the case there is a radial position displacement of the pickup as illustrated in FIG. 11.

Figure 9:
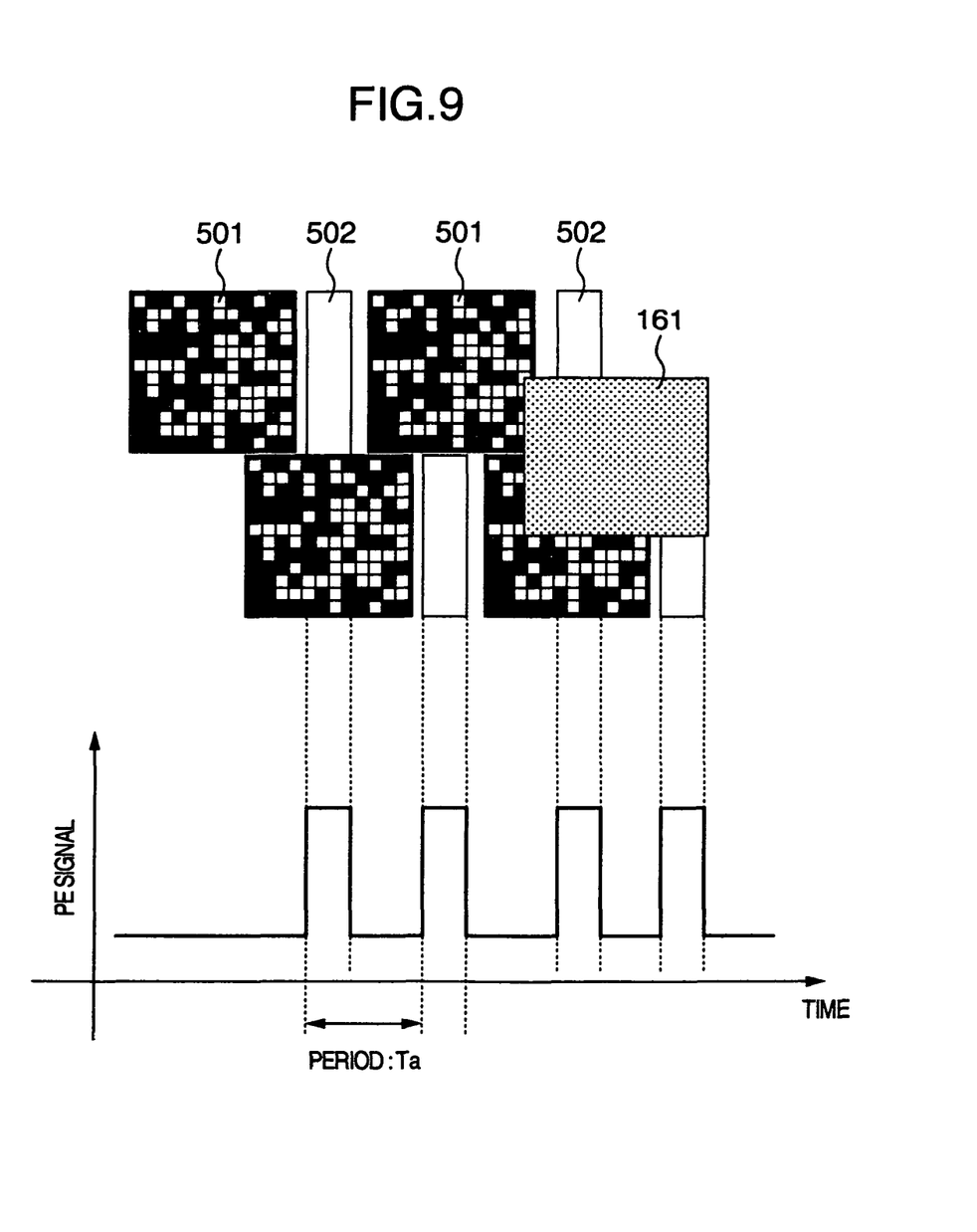
FIG. 9 is a schematic diagram illustrating a PE signal waveform obtained from an optical information recording medium when a radial position of a pickup is displaced.

With reference to FIG. 9, description will be made on a PE signal waveform obtained from an optical information recording medium in the case the radial position of the pickup is displaced.

The optical information recording medium 1 supplies a signal 501 from the recorded area and a signal 502 from the non-recorded area. If the pickup is positioned correctly, the reproduced signal 501 can reproduce recorded data correctly. However, if there is position displacement, a reproduced signal 161 cannot reproduce recorded data correctly. More specifically, the pickup 11 is related to adjacent recorded areas in the radial direction. Signals 501 and signals 502 of the recorded regions 401 and non-recorded regions 402 adjacent in the radial directions become incident upon the pickup 11. The amplitude value and the number of pulses of a PE signal increase so that the period of a pulse wave becomes shorter than that when the pickup 11 is positioned at the correct radial position.

Figure 10:
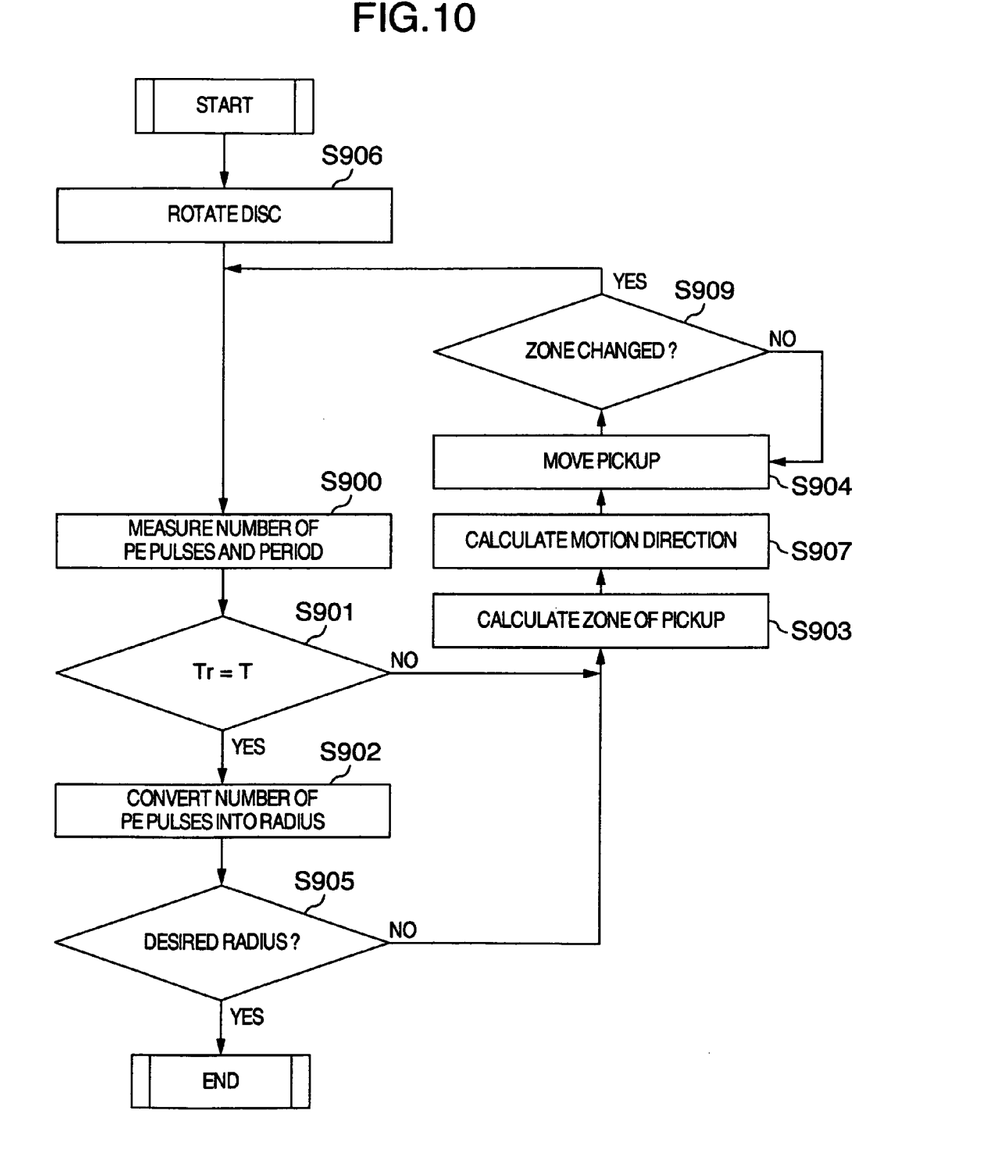
FIG. 10 is a flow chart illustrating a positioning process according to a second embodiment.

A period of a pulse detected when the pickup 11 is positioned correctly at a target radial position is represented by Tr. A value of Tr is dependent upon a linear velocity of the optical information recording medium 1 at the target radial position, a width of the non-recorded region 402, and the like. A period of a pulse detected when the pickup 11 is not positioned correctly is represented by Ta. These periods satisfy a relation of Tr>Ta. Namely, if Tr>Ta, it can be said that positioning of the pickup 11 is not correct. An example of a flow chart is illustrated in FIG. 10 for a process of positioning the pickup 11 at a correct radial position.

At S906 a disc is rotated by a desired angle or by desired turns. Next, at S900 the PE signal measuring circuit 90 measures the number of pulses and a period T of a PE signal. It is judged at S901 whether the period T is equal to Tr. In this specification, the term "equal" includes a substantially equal range, e.g., a measured value range of +1% of a target value. If the period T is equal to Tr, at S902 the number of PE pulses is converted into a radial position by a method similar to that of the first embodiment, and thereafter at S905 it is judged whether the converted radial position is a desired radial position. If the converted radial position is different from the desired radial position, at S903 a difference is calculated between the converted radial position of the pickup 11 and the desired radial position, and position control of the pickup 11 is performed again via the access control circuit 81. Thereafter, the operation from S900 is repeated until the pickup 11 is positioned at a desired radial position.

If the period T is different from Tr, for example, a second function is formed by adding the number of pulses at adjacent radial positions as illustrated in FIG. 11, and the pulse number-zone converting circuit 101 divides the disc into zones (zones 1, 2, 3, . . . , n illustrated in FIG. 11) in accordance with the number of pulses. With this division, the present zone where the pickup 11 is located can be know at S903 as illustrated in FIG. 11. Next, if a desired radial position relative to the present zone is assumed to be the radial potion 2 illustrated in FIG. 11, at S907 the motion direction converting circuit 102 determines an inner circumference direction as a motion direction, and moves the pickup 11 at S904. This motion is repeated until the zone is changed (or the number of pulses is changed) at S909. In this manner, the pickup 11 can be positioned at the optimum radial position 2, and correct recording/reproducing for the optical information recording medium 1 can be performed. The pulse number-zone converting circuit 101 is a calculating circuit for converting the number of pulses into a radial position, and the motion direction converting circuit 102 is a calculation circuit for judging from the converted zone whether the desired radial position is at an inner or outer circumference. For example, these circuits are constituted of a DSP such as an ASIC.

Whether the pickup 11 is positioned at a target radial position may be judged from an amplitude of a pulse wave. For example, the target radial position may be judged basing upon whether an amplitude of a pulse wave acquired by the pickup 11 is equal to an amplitude of a pulse wave at the target radial position. A motion speed of the pickup may be changed in accordance with a position difference between the pickup and a zone where the pickup is positioned (for example, a position of the pickup 11 if the pickup rides on two zones).

Third Embodiment

Figure 13:
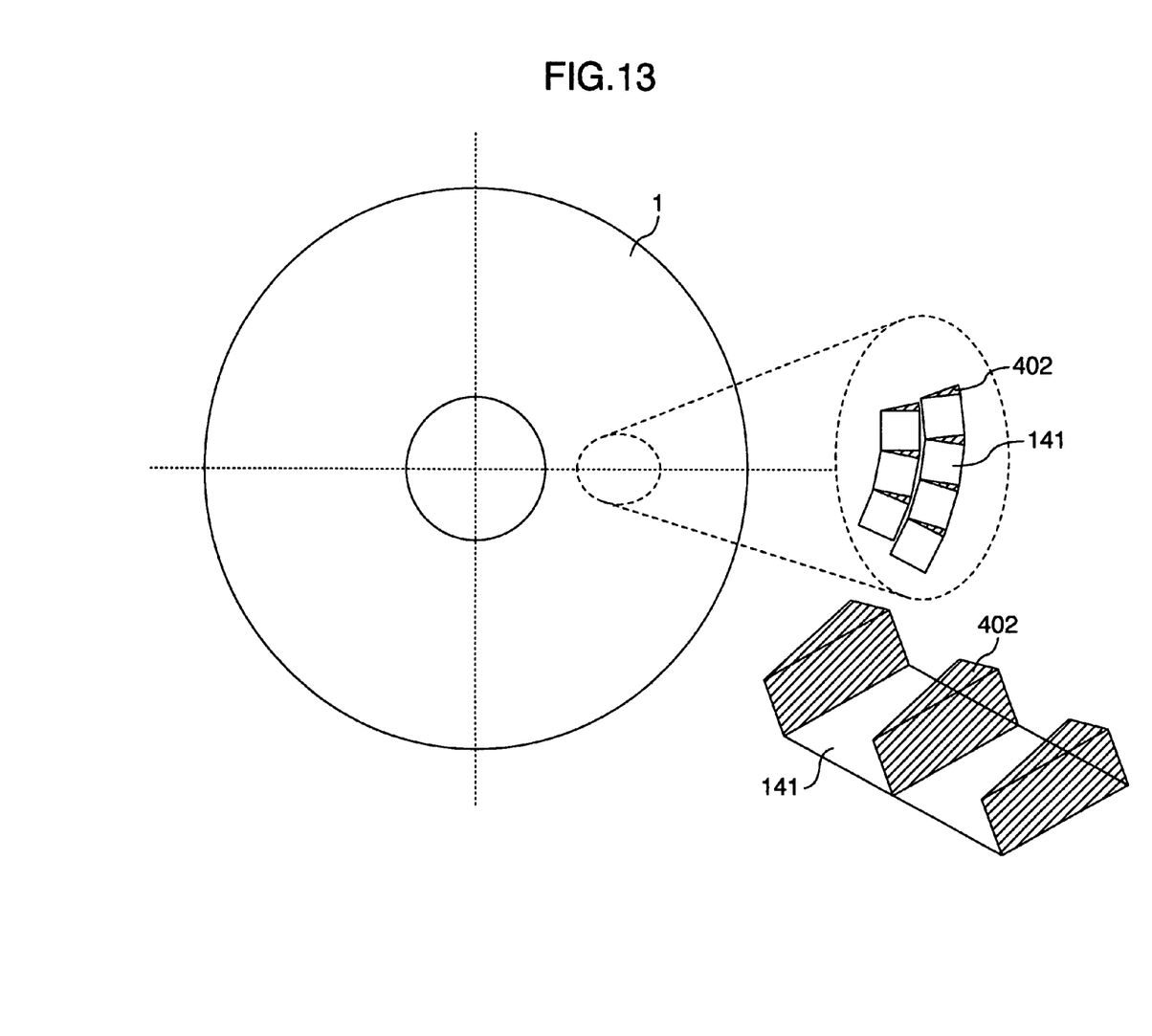
FIG. 13 is a diagram illustrating the structure of a disc having physically formed non-recorded regions.

A shape of record data is fixed as illustrated in FIG. 3, relative to the optical information recording medium 1 having a usually circular shape. Therefore, if it is decided beforehand that data is recorded, for example, in a rectangular shape (like to-be recorded regions 141 in FIG. 13), it can be considered to use an apparatus for physically manufacturing portions corresponding to non-recorded regions 402 on a disc during disc manufacture processes, as illustrated in FIG. 13. With this arrangement, the first and second embodiments can be performed in a similar manner.

Fourth Embodiment

Figure 14:
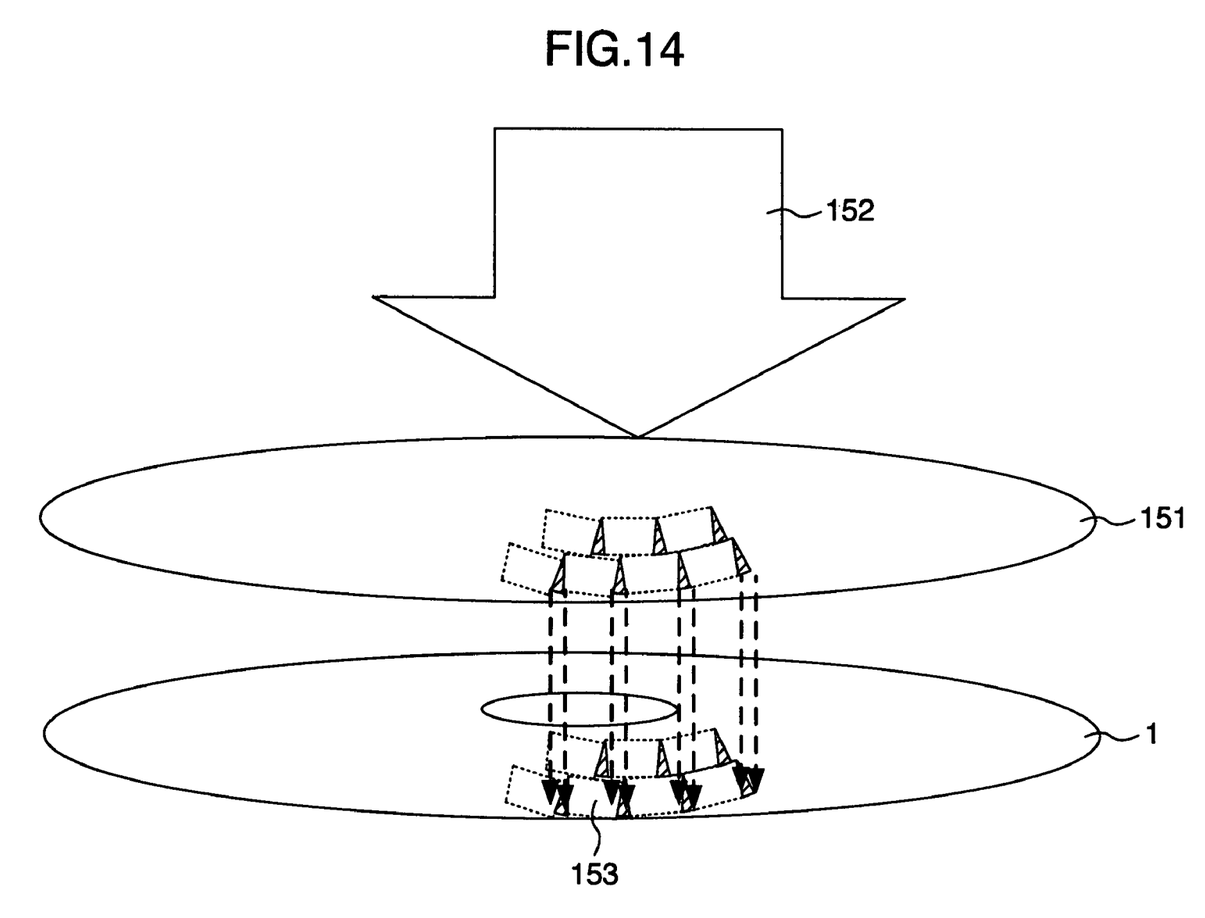
FIG. 14 is a schematic diagram illustrating a disc manufacturing method with non-recorded regions optically exposed in advance.

It can be considered to use a disc manufacture apparatus for forming a photomask 151 not masking the non-recorded regions 402 and exposing in advance monomer on an optical information recording medium 1. With this arrangement, the first and second embodiments can be performed in a similar manner without recording user data on the optical information recording medium 1.

According to the optical information recording/reproducing apparatus 10 of each embodiment described above, it is possible to use the recorded regions of a medium where user data and the like are recorded, as position detection/control. As compared to a case in which pre-grooves and the like dedicated for position detection/control are simply provided on an optical information recording medium 1, it is possible to improve position detection/control by auxiliary utilizing a PE signal obtained from a recorded area and the like. According to the optical information recording/reproducing apparatus 10, since feedback control using the PE signal is possible, positioning not to be dependent upon a motor precision is possible. Further, the apparatus can be manufactured not with an expensive motor but an inexpensive motor, so that an inexpensive apparatus can be developed.

Each embodiment has been described by using the optical information recording/reproducing apparatus 10 by way of example. However, the present invention is not limited to the optical information recording/reproducing apparatus, but the present invention is also applicable to both an optical information recording apparatus and an optical information reproducing apparatus.

In each embodiment, a period of a pulse wave is utilized for detecting a radial position or the like by way of example. The present invention is not limited thereto, but a wavelength of a pulse wave may be utilized for detecting a radial position or the like.

Further, the present invention is not limited to the above-described embodiments, but includes various modifications. For example, the above embodiments have been described in detail in order to facilitate understanding the present invention, and the embodiments are not necessarily limited to having all constituent elements described. Further, some constituent elements of an embodiment may be replaced with some constituent elements of another embodiment. It is also possible to add constituent elements of an embodiment to constituent elements of another embodiment. Still further, some constituent elements of an embodiment may be added to, deleted from or replaced with other constituent elements.

Furthermore, a part or the whole of each configuration described above may be made of hardware, or may be realized by making a processor execute a program. Control lines and information lines shown are considered to be necessary for description. All control lines and information lines are not necessarily required for products. It may be considered that all constituent elements are interconnected actually.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information recording/reproducing apparatus for recording and/or reproducing information relative to a disc-shaped recording medium by photolithography, comprising:
   a pickup for recording information by radiating a reference light and a signal light to said recording medium;
   a motor for rotating said recording medium;
   optical detector means for detecting, in a state that said recording medium is rotated by said motor, a pulse wave generated by light reflected from a plurality of recorded regions juxtaposed in a circumferential direction of said recording medium and light reflected from non-recorded regions formed between said recorded regions; and
   position detecting means for detecting a radial position of said pickup in accordance with the number of pulse waves detected with said optical detector means.

2. The information recording/reproducing apparatus according to claim 1, wherein said position detecting means judges that said pickup is positioned at a target radial position, basing upon whether or not a period of said pulse wave is shorter than a period of a pulse wave at said target radial position.

3. The information recording/reproducing apparatus according to claim 1, wherein said position detecting means detects a displacement amount from a target radial position in accordance with the number of pulse waves detected with said optical detector means, if the number of pulse waves detected with said optical detector means corresponds to a total sum of the number of pulse waves capable of being acquired at one radial position and the number of pulse waves capable of being acquired at another radial position.

4. The information recording/reproducing apparatus according to claim 3, further comprising control means for correcting a radial position in accordance with said displacement amount.

5. The information recording/reproducing apparatus according to claim 1, wherein said position detecting means judges a presence/absence of a non-recorded area where information is not recorded, in accordance with whether or not a period of said pulse wave is longer than a predetermined value.

6. The information recording/reproducing apparatus according to claim 5, further comprising control means for controlling to move said pickup to a changing position at which the period of said pulse wave becomes longer than said predetermined value.

7. The information recording/reproducing apparatus according to claim 5, wherein said predetermined value is a period obtained from reflected light from one recorded region and one non-recorded region contacting said recorded portion.

8. The information recording/reproducing apparatus according to claim 1, wherein:
   the information recording/reproducing apparatus is an information recording/reproducing apparatus for recording and/or reproducing information relative to a circular disc-shaped recording medium; and
   said recorded region has such a shape that as said recorded regions are disposed in said circular disc-shaped recording medium, gaps are formed between said recorded regions.

9. The information recording/reproducing apparatus according to claim 1, wherein said pickup radiates said signal light and said reference light to said recording medium in such a manner that said recorded region is formed in anyone of rectangular, circular and ellipsoidal shapes.

* * * * *